Patented Mar. 14, 1944

2,344,229

UNITED STATES PATENT OFFICE 2,344,229

FOOD PRODUCT

Richard J. Block and Diana Bolling, Scarsdale, N. Y., assignors, by direct and mesne assignments, to C. M. Armstrong, Inc., a corporation of New York No Drawing. Application May 10, 1941, Serial No. 392,954. In Canada September 16, 1940

8 Claims. (Cl. 99—2)

This invention relates to an improved food product of very high biological value.

In food products, particularly food for growing children or feed for animals, an important factor is the so-called biological value of the food, the ratio of gain in weight of the animal to the weight of protein consumed, in a diet which contains adequate amount of other nutritive and essential ingredients.

Because protein is one of the most expensive ingredients of bulk feeds for animals, it is important in such feeds to use a level of nitrogen (proportion of protein) that is as low as consistent with proper nourishment. Furthermore, excessive proportions of protein, if used, result in wastage and an increased demand on the processes of elimination in the animal.

In spite of the disadvantages from the use of large proportions of protein, the proportions of protein commonly specified in feeds are the minima. Thus, dairy feeds are often sold on the basis of a certain percentage, say 20%, of protein. In many other feeds the protein content is guaranteed to be at least equal to a certain minimum.

The present invention provides for a decrease of the protein content of mixed feeds while preserving the nutritive effect of the feed. The invention provides feeds including increased proportions of carbohydrates, with attendant saving in cost per pound and decreased elimination by the kidneys of the animal to which the feed is supplied. In certain embodiments, the invention provides food suitable for human consumption and of greatly increased biological value.

In some cases, the improved food products promote growth of an animal. In other instances, the invention may be used to decrease the cost of feed for a given amount of growth, milk production, egg production, or other result desired.

Briefly stated, the preferred embodiment of the invention comprises the introduction into commercial basic food materials of essential amino acids, that is, those amino acids not readily produced by the animal from other ingredients of the foods. According to the invention, the kinds and amounts of the acids introduced are such that the final mixture contains the several essential amino acids in about the proportions in which they are assimilated by the animal. In a modification, the invention comprises introducing essential amino acids that are most deficient, without attempting to adjust all amino acids to the exact proportions in which they are assimilated.

We have discovered that the carbohydrate content of animal feeds, for instance, may be increased with full preservation of the nutritive effect, when the amino acids are added.

A list of the essential amino acids is as follows: cystine, methionine, threonine, phenylalanine, tyrosine, tryptophane, histidine, arginine, lysine, valine, leucine and iso-leucine.

In addition to the amino acids given above as essential in feeds, glycine may be required by animals under certain conditions, especially as a detoxicating agent or to promote growth of chicks.

When all of the essential amino acids are present in about the proportion assimilated, interesting results are obtained. Thus, rats fed on a mixture of cow's milk powder, sugar, fat, salts, and vitamins were found on the average to gain 37 grams each, in 12 weeks. Male litter mates fed on the same mixture but containing admixed cystine in the amount of 0.2 part for 100 parts of the whole mixture gained approximately 78 grams in the same time.

If only the same rate of growth is desired, then in the composition containing the cystine there is decreased the proportion of the relatively expensive milk powder and there is increased, by an offsetting amount, the proportion of the cheaper sugar. The fat may be kept constant in the diet.

DETERMINING PROPORTION IN WHICH AMINO ACIDS ARE ASSIMILATED

Since the invention provides a food product including each of the essential amino acids in about the proportion assimilated by the animal for which the food is intended, it is important to determine the approximate proportions in which each essential amino acid is assimilated by the animal.

In general, the proportions in which the amino acids are assimilated is determined by analysis.

Thus, the proportion of essential amino acids in a growth ration for animals is formulated upon the basis of the analysis of the animal. More specifically, a typical whole animal would be analyzed, to determine the proportion of the essential amino acids to each other. This analysis shows satisfactorily closely for the present purpose the proportions in which these amino acids are assimilated during the feeding period. The matter is somewhat simplified because of the fact that the proportions of the essential amino acids to each other do not change greatly during the time of feeding of the animal. The protein content of the animal remains essentially constant in the percentage therein of the several essential amino acids, the analysis of the animal varying largely in the proportion of water, fat, and other materials which are easily determined and corrected for in the analysis. It is sufficient, therefore, to analyze a typical animal during the usual feeding or growth period. The proportion of the essential amino acids found by the analysis is that used in formulating feed for other like animals as a growth ration.

In the case of a dairy ration, it is necessary to determine not only the increase in essential amino acids in the body of the animal, as by analysis and observation of the increase in weight, if any, of the protein content of the animal, but also the essential amino acids content of the milk taken from the animal.

In the case of a laying ration for hens, the optimum proportions of the several essential amino acids is determined in part by analysis of the eggs for the said acids.

For the laying ration and also for other rations, it is important in many instances to correct for the essential amino acids which are lost in the form, say, of feathers, hair, wool, or other products. These can be retained in the case of the animal of each kind and included in the total analysis.

Once an analysis of the essential amino acids assimilated in the rations for different purposes is determined, additional analyses to determine the optimum proportions are not necessary.

A correction may be made for the amounts of the essential amino acids which are eliminated by the animal or consumed in miscellaneous functions. Certain amino acids, even when deficient in the diet, are destroyed to an appreciable extent, in the production of such materials as hormones and enzymes and in certain other metabolic processes, decomposition products of the amino acids so destroyed appear in the urine of the animal. In addition, there is sometimes a small loss of amino acids by bacterial decomposition in the intestines.

An example of the materials that are destroyed in the system, even though present in an amount which is below the optimum, is phenylalanine. This amino acid is utilized by the animal in part in the production of hormones and enzymes. Among the materials lost in large proportion in the hair or feathers of an animal is methionine, or its transformation product, cystine.

For most purposes, however, it is sufficient to analyze the animal and the principal products that come from the animal without correction for the amounts of amino acids which are lost in such manner that the by-products of the decomposition appear in the urine or feces. Such analysis is adequate especially in the case of animals in which the greater proportion of the food consumed is utilized in growth, lactation, or egg production, these cases being those in which quantity feeding is ordinarily made and to which the present invention is particularly directed.

ANALYSES OF FOOD PRODUCTS

In Tables I, II and III there are shown the approximate analyses of various food products as determined by us, some of these products being not only basic food materials but also products that it is desired to produce economically through feeding our special feed stuffs. The analyses may be made by suitable conventional methods.

In these tables, the first line shows the nitrogen content of the whole product analyzed. Subsequent lines, reading downward, show the percentage first of sulfur and then of each essential amino acid in the protein content of the product, the protein content of the food being first calculated by multiplying the percentage of nitrogen in the food by the factor 6.25.

In the various tables of analyses, the proportions of the amino acids are rounded averages, and are only approximate.

TABLE I

Analyses of proteins from various sources

| Ingredient (amino acids as per cent of protein) | Source of protein | | | | | | |
|---|---|---|---|---|---|---|---|
| | Cow's milk | Human milk | Casein cow | Lactalbumin | Egg hen | Egg white | Egg yolk |
| Nitrogen | 15.2 | 15.2 | 14.7 | 13.8 | 14.0 | 13.9 | 14.5 |
| Sulfur | 0.9 | 1.5 | 0.7 | 1.4 | 1.6 | 1.7 | 1.1 |
| Cystine | 1 | 3 | 0.3 | 3 | 2 | 2 | 2 |
| Methionine | 3 | 3 | 3 | 3 | 5 | 5 | 3 |
| Arginine | 3 | 4 | 4 | 3 | 6 | 6 | 7 |
| Histidine | 2 | 2 | 2 | 2 | 2 | 2 | 2 |
| Lysine | 5 | 5 | 6 | [1] 8.4 | 4 | 5 | 5 |
| Tyrosine | 5 | 5 | 5 | 4 | 4 | 4 | 4 |
| Tryptophane | 1 | 1 | 1.5 | 2 | 1.5 | 1.5 | 1.5 |
| Phenylalanine | 6 | 6 | 6 | 5 | 5 | 6 | 5 |
| Threonine | 4 | 4 | 4 | 5 | 5 | 4 | 5 |
| Valine | 5 | 5 | 6 | 5 | 5 | 5 | 5 |
| Leucine | 15 | 15 | 15 | 20 | 15 | 15 | 15 |
| Isoleucine | 4 | 4 | 5 | 6 | 5 | 5 | 5 |

[1] The figure for lysine in lactalbumin in the table is taken from Hawk and Bergeim, Physiological Chemistry, 11th ed., page 104.

TABLE II

Analyses of various food products

| Ingredient (amino acids as per cent of protein) | Source of protein | | | | |
|---|---|---|---|---|---|
| | Blood serum | Gelatin | Yeast | Flour white | Bread white |
| Nitrogen | 15.0 | 16.0 | 8.0 | 2.3 | 2.6 |
| *Analyses of proteins* | | | | | |
| Sulfur | 1.5 | 0 | 0.8 | 1.0 | 1.1 |
| Cystine | 3 | 0 | 1 | 2 | 2 |
| Methionine | 3 | 0 | 3 | 2 | 3 |
| Arginine | 5 | 7 | 4 | 3 | 3 |
| Histidine | 2 | 0.5 | 2 | 2 | 2 |
| Lysine | 7 | 4 | 6 | 1.5 | 2 |
| Tyrosine | 4 | 0.1 | 4 | 4 | 4 |
| Tryptophane | 1 | 0 | 1 | 0.6 | 1.5 |
| Phenylalanine | 7 | 2 | 4 | 5 | 4 |
| Threonine | 6 | 1 | 5 | 5 | 3 |
| Valine | 6 | 2 | 5 | 3 | 3 |
| Leucine | 20 | 3 | 10 | 10 | 10 |
| Isoleucine | | 1 | 4 | 3 | 3 |

TABLE III

Analyses of corn products

| Ingredient (amino acids as per cent of protein) | Source of protein | | | |
|---|---|---|---|---|
| | Whole corn | Corn germ | Steep water | Gluten meal |
| Nitrogen | 1 | 1.7 | 7.5 | 8.1 |
| *Analyses of proteins* | | | | |
| Sulfur | 1.6 | 0.95 | 2 | 1.2 |
| Cystine | 1 | 1 | 0.6 | 0.5 |
| Methionine | | 3 | 6 | 6 |
| Tyrosine | 5 | 4 | 6 | 7 |
| Tryptophane | 1.5 | 1.5 | 1 | 1.5 |
| Phenylalanine | 4 | 5 | 1.5 | 6 |
| Arginine | 4 | 8 | 4 | 2 |
| Histidine | 3 | 3 | 5 | 2 |
| Lysine | 1.5 | 5 | 1.5 | 0.8 |
| Threonine | 3 | 4 | 4 | 3 |
| Valine | 5 | 6 | 3 | 4 |
| Leucine | 20 | 20 | 10 | 20 |
| Isoleucine | 3 | 3 | 1.5 | 4 |

The data in Table III relate to the essential amino acid content of corn and various by-products of the manufacture of corn starch. Thus, there are shown the analysis of the protein content of whole corn, the variety analyzed being yellow. There are shown also the analyses of the proteins of corn germ, of corn steep water, and of gluten meal. As stated above, the nitrogen content in the first line of the table is based on the whole material analyzed.

The nature of these corn materials will be obvious. The steep water proteins include the water soluble proteins extracted by the corn, as the corn is steeped preparatory to later processing steps. The gluten meal is water insoluble protein material from corn that is isolated during the separation of starch from the endosperm of the corn.

ADMIXTURE OF THE AMINO ACIDS

Although very desirable, it is not necessary that each of the essential amino acids be present in exactly the proportion to the other essential amino acids in which it is assimilated. Large increases in the biological value of the food products are obtained even when this proportion is realized only approximately.

For this reason, the proportions of the various amino acids given in the following sections hereof may be varied, say by about 50 per cent above or below the amounts stated.

In making the food product, the selected amino acids are mixed well into the basic food material. There is thus produced a mixture that is practically uniform and of proportions desired, all proportions of the essential amino acids, unless otherwise specified, being expressed herein as parts by weight for 100 parts of protein content of the basic feed material on the dry basis.

MODIFICATION OF STEEP WATER PROTEINS

An example of the addition of amino acids to protein materials, so that the ratio of carbohydrate to nitrogen content of the mixed feed may be increased, is the modification of the water soluble proteins of corn.

There is made a feed, particularly suitable for use as a dairy ration, by forming a mixture of a very large proportion of carbohydrate, a relatively small proportion of proteins derived from the steep water of corn, and a very small proportion of essential amino acids which are present in the steep water proteins in proportions, to other essential amino acids, less than those in which the amino acids are assimilated by the animal. To make the improved feed, there are added the following deficient essential amino acids in about the proportions shown for 100 parts of protein:

| Amino acid | Parts |
|---|---|
| Cystine | 0.5 |
| Phenylalanine | 4 |
| Lysine | 4 |
| Valine | 3 |
| Leucine | 5 |
| Isoleucine | 2 |

The selected amino acids may be added to the steep water proteins or compositions containing them, the whole being mixed to give a composition that is substantially uniform. If desired, the mixture is subsequently dried.

Steep water proteins so modified by the addition of the deficient essential amino acids may be substituted in the mixed feed for the unmodified steep water protein, with a simultaneous large increase in the allowable carbohydrate content of the feed. Thus, the proportion of protein in the whole need be only about half of the proportion of the protein required when no essential amino acids are admixed. If, for instance, the usual steep water proteins are made into a dairy feed containing 20% of protein material and 80% of carbohydrate and other ingredients, an improved feed of satisfactory nutritive effect including the added essential amino acids, may be made to contain as little as 10% or less of protein, the remainder being carbohydrate and other usual non-protein materials.

We have found that phenylalanine and lysine, particularly, give important increases in the biological value of the steep water proteins for dairy ration. For this reason, these amino acids or sources of them alone may be added to the said proteins. However, somewhat better results are obtained when the admixed amino acids include also valine, leucine and isoleucine. The best results are obtained when cystine also is included, as stated above.

In making a laying ration, the steep water proteins are modified by the admixture of the following amino acids in the number of parts shown for 100 parts of the protein material:

| Amino acid | Parts |
|---|---|
| Cystine | 2 |
| Arginine | 2 |
| Lysine | 3 |
| Phenylalanine | 4 |
| Valine | 2 |
| Leucine | 5 |
| Isoleucine | 4 |

The chief difference in the ration for laying hens and the ration for dairy cows is the increased proportion of the sulphur-containing amino acid, cystine, and the presence of arginine in the laying ration.

MODIFICATION OF CORN GLUTEN

A dairy ration is made by mixing corn gluten meal with a source of the following amino acids in about the proportions shown for 100 parts of protein of the corn gluten:

| Amino acid | Parts |
|---|---|
| Cystine | 0.1 to 0.5 |
| Lysine | 4 |
| Valine | 3 |

The addition of a source of lysine alone greatly improves the biological value of the corn gluten, although the improvement is not as great as when cystine and valine also are added.

MODIFICATION OF WHEAT GLUTEN

Wheat gluten is modified, as for use in flour for bread making, by the addition of sources of the following amino acids in the number of parts shown for 100 parts of protein of the wheat gluten:

| Amino acid | Parts |
|---|---|
| Tryptophane | 1 |
| Cystine | 2 |
| Lysine | 4 |
| Valine | 2 |
| Leucine | 10 |

For most purposes, lysine alone is a satisfactory admix to wheat gluten, although a larger improvement results from the admixture of all the acids tabulated above.

In connection with the proportions of the amino acids to be added to the wheat gluten, corn gluten, or other cereal proteins in accordance with tables above, there is noted the statement previously made herein to the effect that the proportions of the various amino acids may be varied by about 50% above or below the amounts stated. Thus, the proportion of lysine to be added to corn steep water proteins in making a dairy ration, to corn gluten, or to wheat gluten may be varied from 2 to 6 parts for 100 parts of the cereal protein.

MODIFICATION OF COW'S MILK

Cow's milk, for feeding of infants and certain animals primarily for growth, is modified by the addition of about 2 parts of cystine and 1 part of arginine for 100 parts of the protein. For some purposes the arginine may be omitted, the milk with only the cystine added showing a high biological value as a diet for growth, but not as high as when both cystine and arginine are added.

For infant feeding purposes, the cow's milk with added amino acids has additional sugar added, as, for example, in the form of lactose, sucrose, or starch conversion products. Thus, the percentage of carbohydrate in the milk is suitably increased to equal that of human milk, the water also being increased by about 60%. The added water serves the purpose of diluting what would otherwise be too rich a milk.

A formula for a suitable modified cow's milk is the following:

| Material | Parts |
| --- | --- |
| Cow's milk | 100 |
| Water | 60 |
| Selected sugar | 5 |
| Cystine | .07 |

In a modified cow's milk for use as an egg laying ration, there is mixed into the milk or milk powder the following:

| Amino acid | Parts |
| --- | --- |
| Cystine | 3 |
| Arginine | 3 |
| Tryptophane | 0.5 |

MODIFICATION OF GELATIN

In modifying gelatin, as, for example, in a growth ration for rats, the gelatin is mixed with sources of the following amino acids in about the number of parts shown for 100 parts of gelatin:

| Amino acid | Parts |
| --- | --- |
| Methionine | 3 |
| Histidine | 1 |
| Tryptophane | 1 |
| Phenylalanine | 4 |
| Threonine | 3 |
| Valine | 2 |
| Leucine | 10 |
| Isoleucine | 3 |

RESULTS OBTAINED FROM MODIFIED FOOD PRODUCTS

The advantages of certain of the food products modified as described have been stated in detail in other sections hereof.

From the food products modified as described, there is obtained a large increase in the biological value of the protein with an attendant desirable decrease in the proportion of certain surplus amino acids that, when present in excess, must be decomposed and eliminated by the consuming animal.

Also, there is made possible and desirable the use of an increased proportion of the non-protein or carbohydrate component, say, the ground corn content of mixed feeds. The result is a lowering of the cost per pound of the feed, whereas the more efficient utilization of the feed maintains the nutritive effect for growth, milk, or egg production.

SOURCES OF THE ESSENTIAL AMINO ACIDS

Any conventional or convenient source of the amino acids may be used. The source may be the amino acid itself in pure or impure form or protein that, by digestion and assimilation, produces the essential amino acid or a compound of it. Partially or completely hydrolyzed proteins (hydrolysates) particularly are suitable sources, provided the protein selected for hydrolysis is one that gives the desired amino acid in relatively large proportion.

In some cases, different sources of the several amino acids may be added to the same basic food material, whereas in other instances one protein or protein hydrolysate may serve as the source of more than one of the amino acids.

Methionine may be used as a source of cystine, inasmuch as methionine undergoes transformation to cystine to a certain extent in the body of an animal.

A few of the suitable sources of the various essential amino acids are shown below, the sources being incorporated in the basic food material either as such or after being partially or largely hydrolyzed into its constituent amino acids. In case a source material shown is not assimilable as such, then the said material is hydrolyzed before use. Hydrolysis is necessary, for instance, in the case of the keratins.

TABLE IV

*Sources of amino acids*

| Amino acid | Suitable source |
| --- | --- |
| Cystine | Keratins such as hair, wool, horn. |
| Methionine | Synthetic methionine. |
| Arginine | Edestin, cattle blood solids. |
| Histidine | Cattle blood solids. |
| Lysine | Blood serum solids, lactalbumen. |
| Tyrosine | Keratins, corn gluten. |
| Tryptophane | Lactalbumen, casein. |
| Phenylalanine | Blood serum solids, gluten meal. |
| Threonine | Blood serum solids, synthetic threonine. |
| Valine | Casein, blood serum solids. |
| Leucine | Casein, gluten meal. |
| Isoleucine | Casein, lactalbumen, egg yolk. |
| Glycine | Gelatin. |

In the case of lysine, for instance, there is shown in the immediately preceding table the use of blood serum solids or lactalbumen as a suitable source for admixture with the food product. It is known that the lower of these two sources in lysine content, namely, lactalbumen contains about 8.4% lysine (see Hawk and Bergeim, Practical Physiological Chemistry, 11th ed., page 104). When such a rich source of lysine is used, there may be added the desired proportion of lysine without disturbing objectionably the ratios of the other components of the food to each other. For this reason it is preferred to provide lysine by admixture of a source of it containing at least 8.4 parts to 100 parts of the said source. It is known that blood proteins are high in lysine content. It is stated in Table II above that an approximate analysis of blood serum proteins shows 7% lysine. It is stated by Hawk and Bergeim (page 104) that globin contains 11% of lysine.

Any or all of the amino acids may be synthetic. It will be understood also that our compositions may be used in conjunction with admixed fats, carbohydrates, and salts and vitamins that are conventional in food products for the various purposes.

The details that have been given are for the purpose of illustration of the invention. It will be understood that variations within the spirit of the invention are intended to be included within the scope of the appended claims.

What we claim is:

1. A food product comprising cereal protein and an admixed source of lysine, the said source providing the equivalent of 2 to 6 parts of lysine for 100 parts of the cereal protein and greatly increasing the biological value of the food product.

2. A food product as described in claim 2 the said source containing at least 8.4 parts of lysine to 100 parts of the said source so as to provide the desired lysine without objectionably disturbing the ratios of the other ingredients of the product to each other.

3. A dairy ration comprising water soluble proteins from corn and admixed sources of phenylalanine and lysine, in the proportion of at least approximately 4 parts of phenylalanine and 4 parts of lysine for 100 parts of the said proteins.

4. A laying ration for hens comprising water soluble proteins from corn and admixed sources of essential amino acids, the admixed amino acids and the proportion of each of them for 100 parts of the said water soluble proteins being approximately as follows: cystine 2, arginine 2, lysine 3, phenylalanine 4, valine 2, leucine 5, and isoleucine 4.

5. A laying ration for hens comprising cow's milk and admixed sources of amino acids, the admixed amino acids and the proportion of each for 100 parts of milk protein being approximately as follows: cystine 3, arginine 3, and tryptophane 0.5.

6. A dairy ration comprising cereal protein and an admixed source of lysine, the proportion of the lysine being approximately 4 parts to 100 parts of protein.

7. A food product comprising wheat gluten and an admixed source of lysine, the said source providing the equivalent of about 4 parts of lysine for 100 parts of protein of the wheat gluten and greatly increasing the biological value of the wheat gluten.

8. A dairy ration comprising carbohydrate, corn gluten, and an admixed source of lysine, the ration being of low nitrogen level and high biological value and the lysine added corresponding to approximately 4 parts for 100 parts of protein of the corn gluten.

RICHARD J. BLOCK.
DIANA BOLLING.

CERTIFICATE OF CORRECTION.

Patent No. 2,344,229. March 14, 1944.

RICHARD J. BLOCK, ET AL.

It is hereby certified that error appears in the printed specification of the above numbered patent requiring correction as follows: Page 5, first column, line 19, claim 2, for the claim reference numeral "2" read --1--; and that the said Letters Patent should be read with this correction therein that the same may conform to the record of the case in the Patent Office.

Signed and sealed this 30th day of May, A. D. 1944.

Leslie Frazer

(Seal) 1 Acting Commissioner of Patents.